United States Patent [19]
Kubogata

[11] Patent Number: 5,589,282
[45] Date of Patent: Dec. 31, 1996

[54] MAGNETO-OPTICAL RECORDING MEDIUM

[75] Inventor: Masayuki Kubogata, Tokyo, Japan

[73] Assignee: NEC Corporation, Tokyo, Japan

[21] Appl. No.: 278,225

[22] Filed: Jul. 21, 1994

[30] Foreign Application Priority Data

Jul. 22, 1993 [JP] Japan .................................. 5-181472

[51] Int. Cl.⁶ ..................................................... G11B 5/66
[52] U.S. Cl. ........................... 428/694 ML; 428/694 DE; 428/694 SC; 428/694 XS; 428/694 NF; 428/694 RL; 428/694 EC; 428/694 MM; 428/336; 428/900; 369/13; 369/272; 369/283; 369/286
[58] Field of Search ...................... 428/694 DE, 694 SC, 428/694 XS, 694 NF, 694 RL, 694 EC, 694 MM, 694 ML, 900, 336; 369/13, 272, 283, 286

[56] References Cited

U.S. PATENT DOCUMENTS

| | | | |
|---|---|---|---|
| 4,628,485 | 12/1986 | Tanaka et al. | 365/122 |
| 5,265,073 | 11/1993 | Osato | 369/13 |

FOREIGN PATENT DOCUMENTS

| | | |
|---|---|---|
| 258978 | 3/1988 | European Pat. Off. . |
| 35371 | 1/1990 | Japan . |
| 230535 | 5/1990 | Japan . |

OTHER PUBLICATIONS

"Recording Sensitivity and Lifetime Estimate of a Magneto-Optical Disk", by H. Katayama et al., Journal of Appl. Mag. Soc. Japan vol. 11, No. 2, 1987 pp. 213–216.

Ohta et al, *Proceedings—Optical Data Storage*, "Magneto-optical disk with reflecting layers", SPIE vol. 382, pp. 252–259, Jan. 17–20 1983.

*Primary Examiner*—Leszek Kiliman
*Attorney, Agent, or Firm*—Sughrue, Mion, Zinn, Macpeak & Seas

[57] ABSTRACT

Disclosed is a magneto-optical recording medium capable of high-density recording with low noise level and a high readout signal level. The recording medium of the invention consists of a transparent substrate 11, with a first dielectric layer 12, a reading layer 13, a writing layer 14, a second dielectric layer 15 and a reflective layer 16 being laminated successively thereon in this order, in which the film thickness of the second dielectric layer is greater than that of the first dielectric layer. The magnetic characteristics of each magnetic layer is designed to be such that the magnetization can be transcribed from the writing layer to the reading layer, and that neat marks can be formed in the reading layer by the transcription of the magnetization to realize low noise level. While the thickness of each magnetic lays is 20 nm or more, the total film thickness of the recording layer is 40 nm or more and less than 80 nm. Accordingly, a high readout signal level can be realized by utilizing the optical enhancement under control of reduction in the reflectivity.

14 Claims, 7 Drawing Sheets

MAGNETO-OPTICAL RECORDING MEDIUM

BACKGROUND OF THE INVENTION

1. Field of the Invention

The present invention relates to a magneto-optical recording medium capable of recording, reading and erasing of information, particularly to such medium compatible to visible short-wavelength laser beams, particularly 690 nm or less.

2. Description of the Related Art

Amorphous thin films of rare earth-transition metal alloys which have conventionally been used as the magnetic materials for magneto-optical discs involve a problem of low readout signal levels because of their small Kerr rotation angles. For the purpose of improving the readout signal level, a dielectric layer such as of SiO or $SiO_2$ and a metallic reflective layer are provided on the behind of a recording medium, as disclosed in Japanese Unexamined Patent Publication No. 12428/1982. The cross section of such recording medium is shown in FIG. 1. The structure of this recording medium will hereinafter be referred to as reflective layer structure, in which 91 is a substrate such as of glass, 92 a magnetic layer, 93 a $SiO_2$ thin layer, and 94 a metallic layer. In this medium, the Kerr rotation angle changes by varying the film thickness of the $SiO_2$ thin layer 93, as shown in FIG. 2, Accordingly, the Kerr rotation angle can be increased by suitably selecting the film thickness of the $SiO_2$ thin layer.

Meanwhile, as shown in FIG. 3, an improved reflective layer structure is discussed (Journal of Appl. Mag. Soc. Jpn. Vol. 11, No. 2, 1987). This improved structure additionally has a dielectric layer 112 interposed between the substrate 91 and the magnetic layer 92 in the reflective layer structure of FIG. 1. In the improved structure, since the magneto-optical effects of the light reflected on the surface of the magnetic layer and the light transmitted through the magnetic layer and reflected on the reflective layer are utilized so as to increase the Kerr rotation angle, the film thickness of the magnetic layer is as thin as 20 nm to 30 nm. In this structure, a second dielectric layer having a film thickness of 20 nm, which is thinner than the first dielectric layer (80 nm), is provided. It is reported that the Kerr rotation angle at the wavelength of 780 nm in this case is 1.5° and that the reflectivity is 12%, showing that the reflectivity is lowered due to the increased Kerr rotation angle. The currently available magneto-optical recording media employ such structure so as to increase the Kerr rotation angles and in turn the readout signal levels.

On the other hand, as an improvement of the recording layer itself, an exchange-coupled double-layer film consisting of a layer (reading layer) having a high Curie temperature and a relatively great Kerr rotation angle and a layer (writing layer) having a low Curie temperature and high recording sensitivity is proposed as the recording layer (Japanese Patent Publication No. 35371/1990). The cross-sectional structure of the exchange-coupled double-layer film shown in FIG. 4 consists of a magnetic layer 121 (reading layer) having a high Curie temperature and a small coersivity at room temperature and a magnetic layer 122 (writing layer) having not very high Curie temperature and a great coersivity at room temperature. The conventional record mark formation process in the exchange-coupled double-layer film will be described referring to FIG. 5. As shown in FIG. 5(a), upon irradiation of a laser beam 131 onto the recording layer, the temperature of the irradiated portion is elevated. Since the reading layer 121 has a high Curie temperature, magnetization-of reading layer cannot be disappeared, but magnetization of the writing layer 122 having not very high Curie temperature can be disappeared. If an external magnetic field 132 is applied to he magnetic layer as such, the magnetization of the reading layer 121 is reversed, as shown in FIG. 5(b). As the temperature drops, the magnetization in the reading layer 121 is transcribed to the writing layer 122 by the exchange-coupling, as shown in FIG. 5(c). In such recording process, it is difficult to form net record marks in the reading layer 121 having a high Curie temperature and a small coersivity, leading readily to increased record noise levels.

In such exchange-coupled double-layer film, incorporation of the reflective layer structure, in which the film thickness of the magnetic layer is reduced, is discussed (Japanese Unexamined Patent Publication No. 230535/1990), and the incorporation of such structure is considered to have effects of increasing the Kerr rotation angle and of moderating the thermal interference. The medium consists of a PC (polycarbonate) substrate, with a 80 nm-thick AlSiN dielectric layer, a 15 nm-thick first magnetic layer ($Gd_{0.23}Fe_{0.73}CO_{0.04}$), a 15 nm-thick second magnetic layer ($Tb_{0.22}Fe_{0.72}CO_{0.08}$), and 25 nm-thick AlSiN dielectric layer and a 40 nm-thick Al reflective layer being laminated successively in this order. In this constitution, the total film thickness of the recording layer mounts to 30 nm, and the optical enhancement condition thereof is absolutely the same as in the said improved reflective layer structure. Accordingly, although the Kerr rotation angle can be increased due to the optical enhancement, the problem that the reflectivity is lowered has not yet been cleared.

Further, the problem that the record noise level tends to be increased in the double-layer film has not yet been cleared either.

As described above, in the conventional media having the reflective layer structure, the thickness of the recording layer is reduced so as to obtain a high C/N ratio, and the light reflected on the recording layer and the light transmitted through the recording layer and reflected on the metallic layer are utilized to increase the Kerr rotation angle and magnify the readout signals. The C/N ratio of the magneto-optical disc is characterized by the figure of merit ($\theta_K R^{1/2}$), and it has been considered that the C/N ratio is predominantly dependent on the Kerr rotation angle and that the reflectivity may sufficiently be ten-plus %.

However, as red laser beams having wavelengths of 670 nm to 690 nm have recently been put into practical uses and short-wavelength light sources are actually introduced, a problem manifested that the noise in the circuit system is extremely increased compared with other noises due to the reduction in the radiation sensitivity of the photo-detector. Accordingly, a medium structure which can provide a high reflectivity of 15% or more and a great Kerr rotation angle, in the short wavelength region of visible light and of shorter wavelength is desired.

Although a magneto-optical medium of the reflective layer structure, in which the film thickness of the exchange-coupled double-layer magnetic film is reduced, has been discussed, the medium having such structure involves a problem that if a thin magnetic layer is employed so as to enhance the Kerr rotation, the reflectivity is lowered. Further, since the readout signals depend on the record marks in the reading layer, it has been difficult to form marks which is free from distortion as much as possible in the reading layer having a high Curie temperature or to control the marks so as to minimize the noise. Besides, since the film thickness of the layer having a great Kerr rotation angle in the exchange-coupled film is as thin as 15 nm, the Kerr rotation angle cannot fully be increased, disadvantageously.

SUMMARY OF THE INVENTION

Therefore, it is an objective of the invention to provide a magneto-optical recording medium which can provide an increased Kerr rotation angle in the short wavelength region of visible light or of shorter wavelength without reducing the reflectivity, and which can exhibit excellent read/write characteristics.

The present invention provides a magneto-optical recording medium having a film of amorphous rare earth-transition metal alloy as a recording layer, comprising a substrate, a first dielectric layer, a recording layer, a second dielectric layer, and a reflective layer, laminated in this order, wherein the total film thickness of the recording layer is 40 nm or more and less than 80 nm; and the thickness of second dielectric layer is selected such that it may be greater than that of the first dielectric layer and that the product of Kerr rotation angle and reflectivity may be maximum.

The present invention provides a particularly useful magneto-optical recording medium, wherein the recording layer is of a double-layer film consisting of a reading layer and a writing layer, these reading layer and the writing layer, both having a film thickness of 20 nm or more, being exchange-coupled so as to allow the magnetization to be transcribed from the writing layer to the reading layer.

Further, a material having a refractive index of 2.00 or more and less than 2.45 is particularly excellent as the first dielectric layer.

As the material for the dielectric layer, SiN, ZnS, TaN, SiO, $Ta_2O_5$, AlSiN and AlN can typically be employed. Meanwhile, as the material for the reflective layer, a layer of Al, Ti, Cu, Cr, Ta or an alloy thereof can typically be employed.

In the magneto-optical disc compatible to a short-wavelength light source of visible light or of shorter wavelength, since the noise in the circuit system is not dependent on the optical output level, it is essential to design the medium to have a great reflectivity in order to secure a great optical output level. Therefore, noting the Kerr rotation angle $\theta_k$ and reflectivity R, the present inventors proposes a constitution in which $\theta_k \cdot R$ is great.

Change in $\theta_k \cdot R^{1/2}$ (21) and that in $\theta_k \cdot R$ (22) relative to the film thickness of the recording layer are shown in FIG. 6. The $\theta_k \cdot R^{1/2}$ value increases as the film thickness of the recording layer becomes thinner, and the $\theta_k \cdot R^{1/2}$ values is rather greater in the comparative example medium having a recording layer thickness of about 20 nm. However, $\theta_k \cdot R$ assumes the maximum value when the recording film layer has a film thickness of not less than 40 nm and less than 80 nm. Accordingly the recording layer effectively has a film thickness of not less than 40 nm and less than 80 nm, more effectively in the range of 40 nm to 60 nm.

Use of such thick recording layer enjoys a merit of reducing the medium noise. In an amorphous film of a rare earth-transition metal alloy, a layer having a small anisotropy is formed as an initial layer at the interface with the underlayer. Such interlayer present in the recording layer having a film thickness of about 15 nm to 20 nm increases the medium noise. FIG. 7 shows a change in the noise level relative to the film thickness of the Tb—Fe—Co recording layer. When the medium having a thick recording layer of the invention is compared with the comparative example medium having a recording film thickness of 20 nm, the noise level in the former decreases as the film thickness of the recording layer becomes greater and shows a substantially constant level at a film thickness of 60 nm or more. Since the influence of the initial layer can be neglected in the thick recording layer employed according to the present invention, the medium noise can be held low. Accordingly, in view of the noise level, the recording layer desirably has a film thickness of at least 40 nm, more desirably 60 nm or more.

As described above, if the recording layer has a film thickness of less than 40 nm, the noise will greatly be increased; whereas if it is 80 nm or more, the intensity of the signal will be insufficient. Accordingly, the recording layer should critically have a film thickness of not less than 40 nm and less than 80 nm. The thus designed medium exhibits excellent characteristics particularly in the form of a magneto-optical disc compatible to a short-wavelength source of visible light or of shorter wavelength.

In the recording medium of the present invention, if the second dielectric layer is thinner than the first dielectric layer like in the conventional structure, Kerr enhancement will insufficiently be achieved. The relationship between the film thickness of the first dielectric layer and that of the second dielectric layer, when the recording layer has a film thickness of 40 nm to 80 nm, will be described further. The change in $\theta_k \cdot R$ relative to the film thickness of the second dielectric layer, for example, when a Tb—Fe—Co layer having a film thickness of 60 nm and a SiN layer having film thickness of 74 nm are used as the recording layer and the firs dielectric layer, respectively, is shown in FIG. 8. When the second dielectric layer has a film thickness of about 140 nm, $\theta_k \cdot R$ assumes the maximum value. Thus, when the recording layer has a film thickness of 40 nm to 80 nm, the provision that the film thickness of the second dielectric layer is greater than that of the first dielectric layer is needed to achieve the maximum $\theta_k \cdot R$.

In a more preferred medium constitution, the recording layer is allowed to have a double-layer structure. Since a reading layer of a material having a great Kerr rotation angle can be combined with a writing layer having high recording sensitivity in the double-layer structure, the Kerr rotation angle of the medium can further be increased. If a writing layer having a film thickness of 20 nm or more, desirably 30 nm or more is used in the double-layer recording film, $\theta_k$ can fully be increased. A change in the carrier level relative to the recording power when the thickness of the reading layer is changed with the thickness of the writing layer being unchanged is as shown in FIG. 9. As apparent from FIG. 9, a greater carrier level can be secured in the 40 nm-thick reading layer rather than in the 20 nm-thick reading layer. The thickness of the writing layer to be combined with such reading layer should be thin in order to minimize the influence of thermal interference and to establish the reflective layer structure. For such purposes, the properties of the magnetic layer must be modified such that the wall energy density $\sigma_w$ of the reading layer may be smaller than that of the writing layer except around the Curie temperature of the writing layer so as to allow the magnetization in the writing layer to be transcribed to the reading layer. By employing such double-layer structure recording film, a medium characterized by a reduced noise level and a high carrier level can be obtained.

BRIEF DESCRIPTION OF THE DRAWINGS

The features of this invention that are believed to be novel are set forth with particularly in the appended claims. The invention, together with the objects and advantages thereof, may best be understood by reference to the following description of the preferred embodiments taken in conjunction with the accompanying drawings in which:

DETAILED DESCRIPTION OF THE PREFERRED EMBODIMENTS

Example 1

Figure 10:
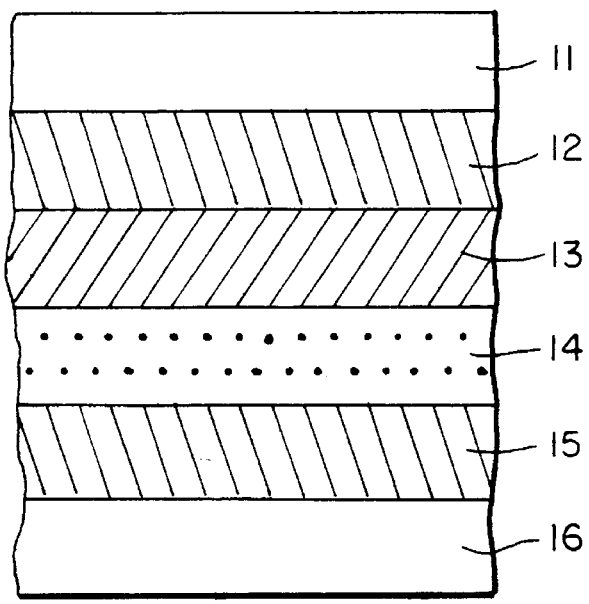
FIG. 10 shows a constitution diagram (cross section) of the medium according to the present invention.

The present invention will be described referring to the attached drawings. The cross-sectional structure of the magneto-optical disc according to one embodiment of the invention is shown in FIG. 10, in which 11 is a transparent substrate such as a PC substrate or a glass substrate; 12 a SiN layer having a thickness of 74 nm as the first dielectric layer; 13 a 30 nm-thick magnetic layer (reading layer) having a high Curie temperature and a low coersivity; 14 a 30 nm-thick magnetic layer (writing layer) having a low Curie temperature and a high coersivity; 15 a SiN film having a thickness of 146 nm as the second dielectric layer, and 16 a Ti metallic layer having a thickness of 40 nm or an Al metallic layer having a thickness of 30 nm as the reflective layer. The film thickness of each SiN dielectric layer was such that $\theta_k \cdot R$ might assume a great value at a laser wavelength band of 680 nm. These layers were fabricated by means of sputtering. All of the layers except for the metallic layer 16 were formed successively and continuously without breaking the vacuum.

The composition of the reading layer $Gd_x(Fe_{1-y}Co_y)_{1-x}$ was in the range of:

$0.15 \leq x \leq 0.25$, $0.15 \leq y \leq 0.25$, and x of about 0.2 and y of about 0.2 were used herein.

Meanwhile, the composition of the writing layer $Tb_x(Fe_{1-y}Co_y)_{1-x}$ was in the range of:

$0.15 \leq x \leq 0.25$, $0.0 \leq y \leq 0.1$, and x of about 0.2 and y of about 0.05 we e used herein.

By designing such medium constitution, a reflectivity of 27.5% was achieved.

Comparative Example 1

Figure 1:
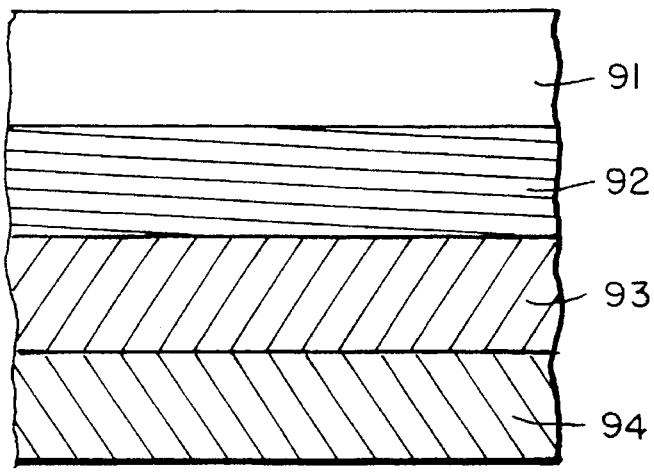
FIG. 1 shows the constitution diagram (cross section) of the prior art reflective layer structure.
Figure 2:
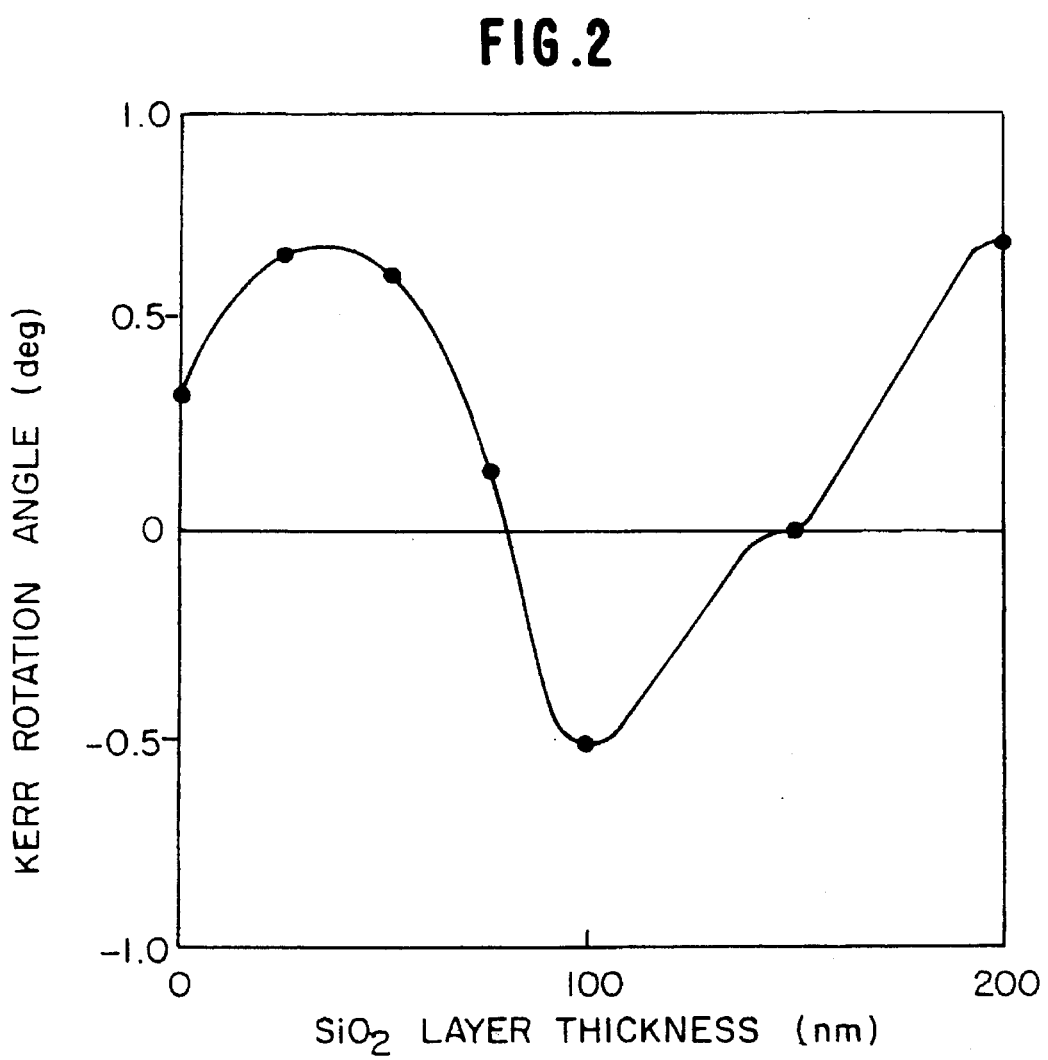
FIG. 2 shows a change in the Kerr rotation angle relative to the film thickness of $SiO_2$ layer in the reflective layer structure.
Figure 3:
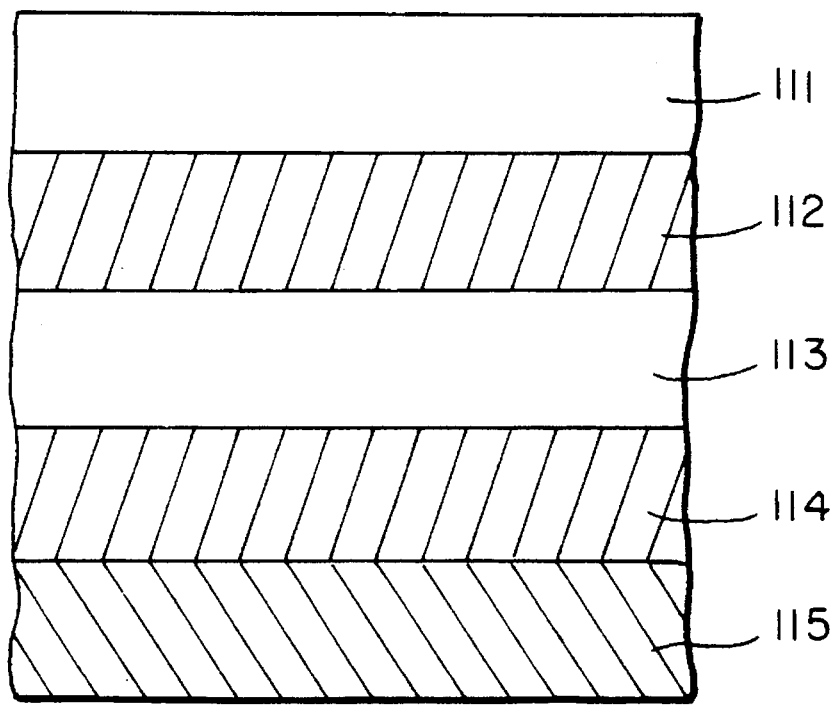
FIG. 3 shows the constitution diagram (cross section) of the improved reflective layer structure.
Figure 4:
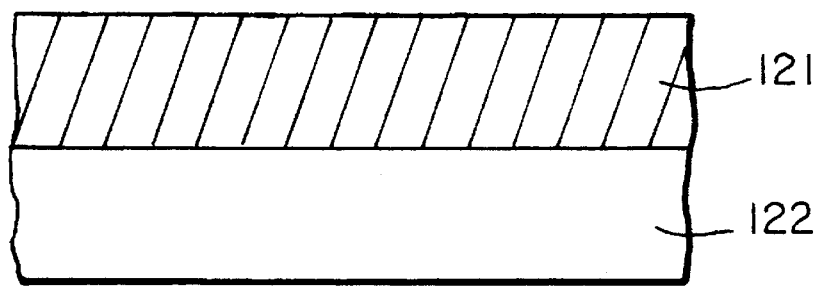
FIG. 4 shows a cross-sectional view of the conventional exchange-coupled double-layer film.
Figure 5A:
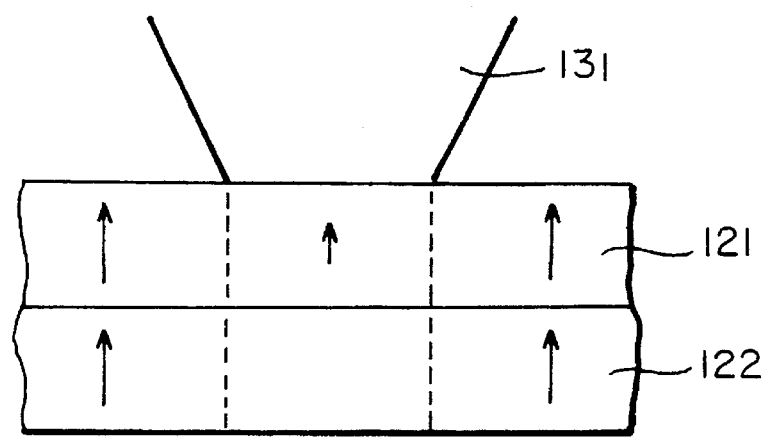
FIG. 5 shows an explanatory view of the record mark formation process in an exchange-coupled double-layer film.
Figure 5B:
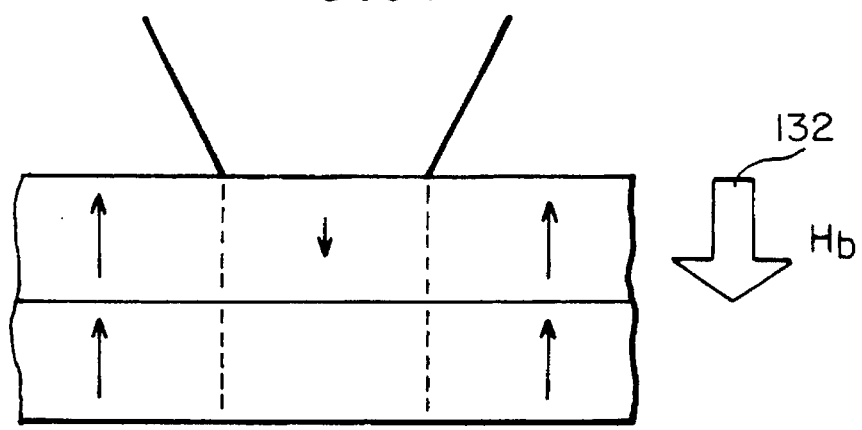
Figure 5C:
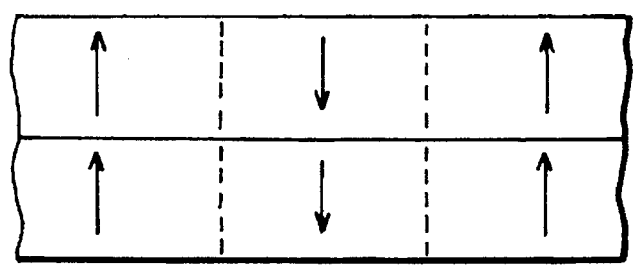
Figure 6:
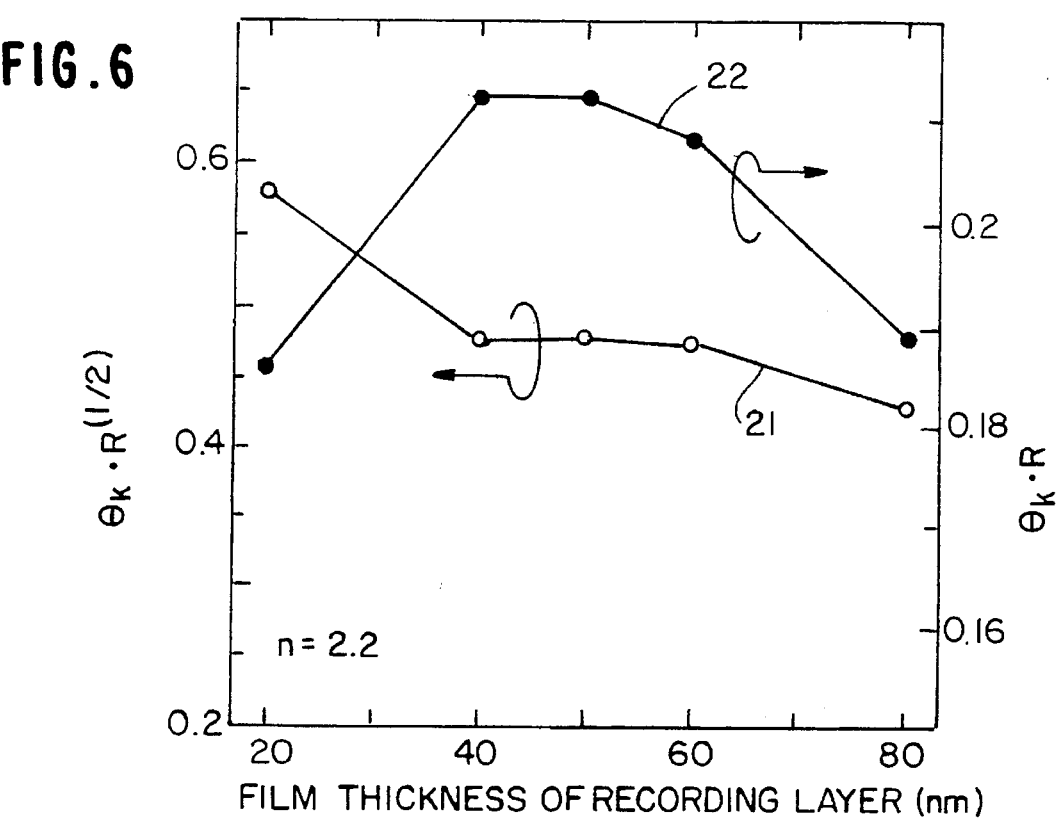
FIG. 6 shows changes in $\theta_k \cdot R^{1/2}$ and $\theta_k \cdot R$ relative to the thickness of the recording layer.
Figure 7:
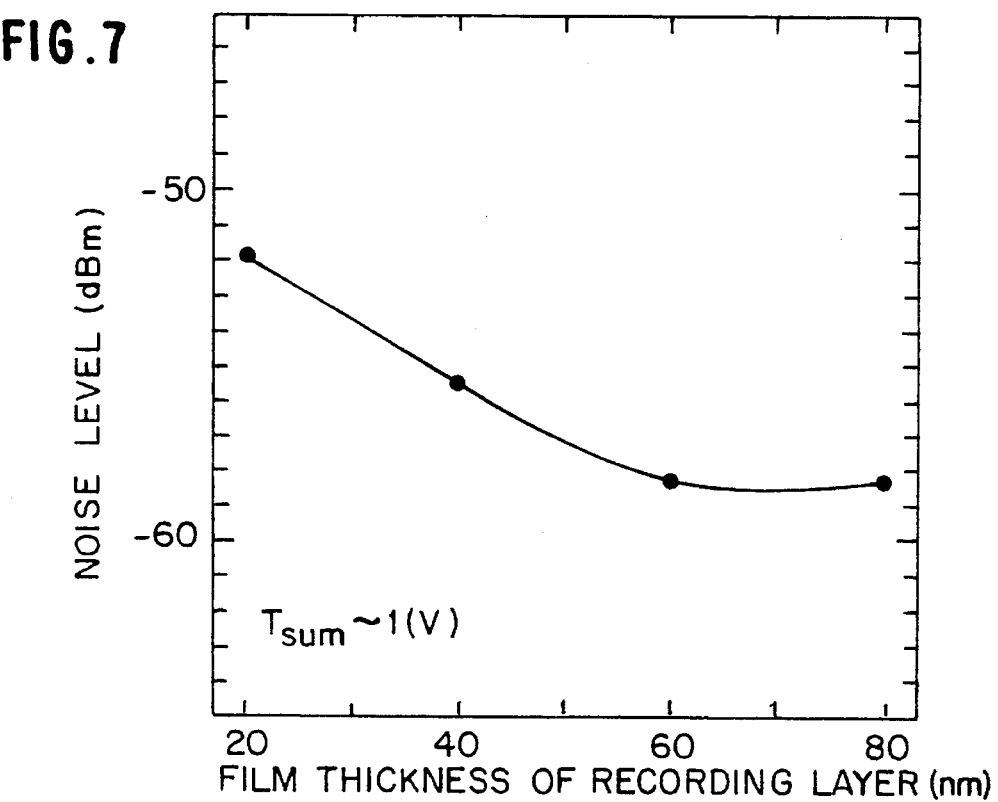
FIG. 7 shows a change in the noise level relative to the film thickness of the recording layer.
Figure 8:
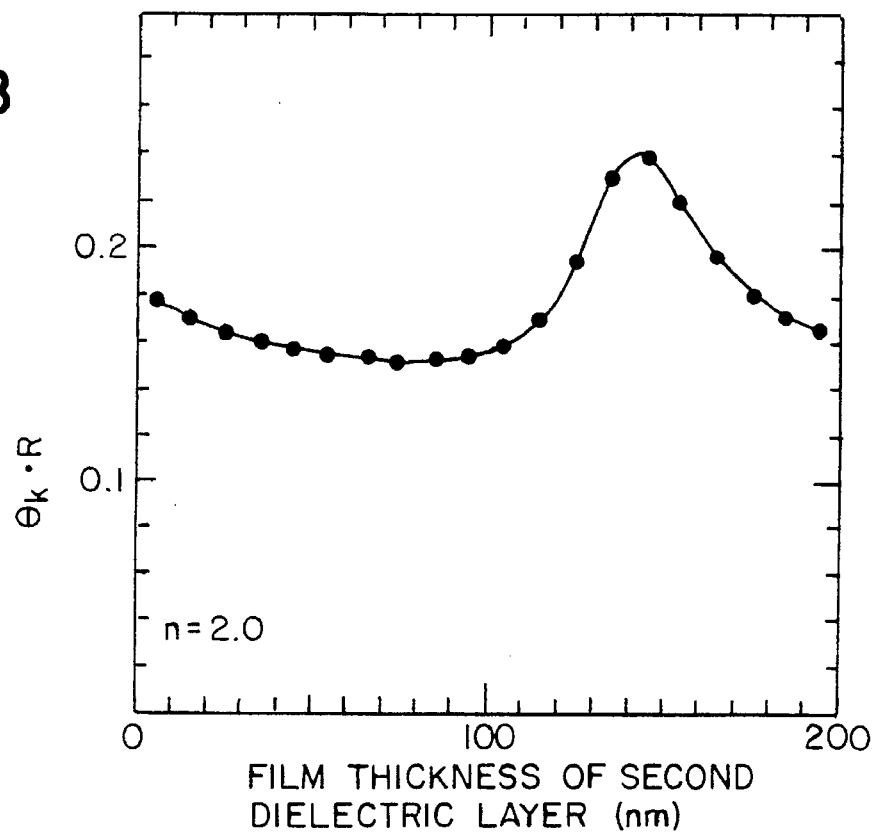
FIG. 8 shows a change in $\theta_k \cdot R$ relative to the film thickness of the second dielectric layer.
Figure 9:
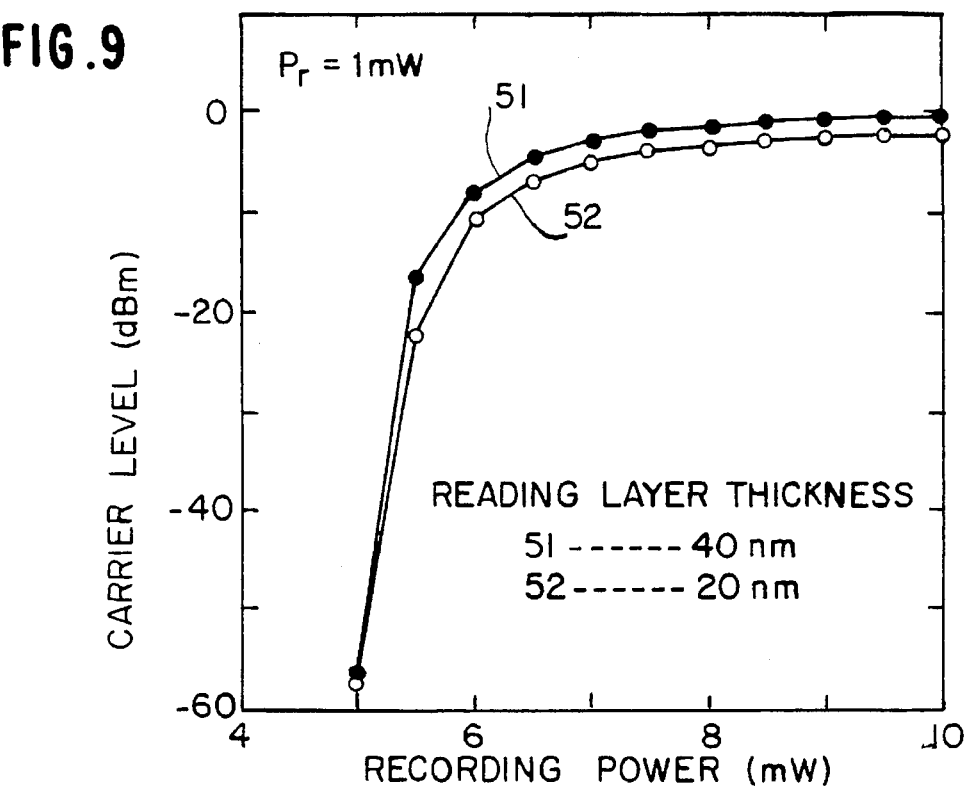
FIG. 9 shows a relationship between the carrier level and the recording power when the thickness of the reading layer is changed.

According to the medium constitution shown in FIG. 3, 68 nm-thick SiN first dielectric layer, 20 nm-thick Tb—Fe—Co magnetic layer, a 28 nm-thick SiN second dielectric layer and a 40 nm-thick Al reflective layer were successively laminated onto a substrate. The composition of the Tb—Fe—Co magnetic layer was the same as that of the writing layer in

Example 1

The results of evaluations of Example 1 and Comparative Example 1 are as follows.

Figure 11:
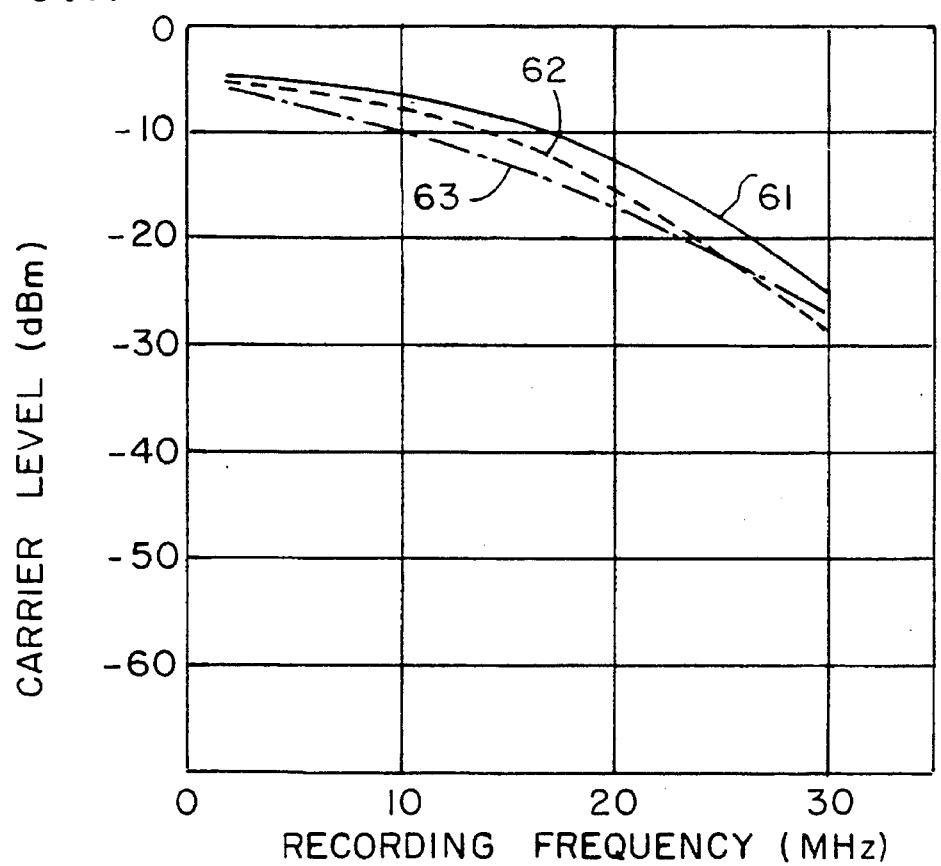
FIG. 11 shows a change in the carrier level relative to the recording frequency.

FIG. 11 shows a change in the carrier level relative to the recording frequency, in which 61 is the carrier level of the medium of the invention employing an Al metallic layer; 62 the carrier level of the medium of the invention employing a Ti metallic layer; and 63 the carrier level of the comparative example medium. In the case of employing a Ti metallic layer, although the carrier level failed to reach that of the comparative example medium at a recording frequency of 25 MHz or higher, it greatly exceeded that of the comparative example medium at a recording frequency of less than 25 MHz. Meanwhile, as indicated by 61, the use of the Al metallic layer realized a carrier level greatly exceeding that of the comparative example medium even at a recording frequency of 30 MHz. Further, the recording sensitivity in the medium of the invention could be controlled by employing a reflective layer having a different thermal conductivity.

These evaluations were carried out at a laser wavelength of 680 nm and a linear velocity of 27.3 m/s.

Example 2

Another embodiment of the invention will be described. The embodiment shown there is of the same constitution as the cross-sectional constitution of the magneto-optical disc shown in FIG. 10, in which a 62 nm-thick ZnS first dielectric layer 12, a reading layer 13 and a writing layer 14 both having the same compositions and thicknesses as in Example 1, a 123 nm-thick ZnS second dielectric layer 15 and a 50 nm-thick Ti metallic reflective layer 16 were formed. Like in Example 1, the thickness of the first dielectric layer and that of the second dielectric layer were such that $\theta_k \cdot R$ may assume great values at a wavelength of 680 nm. These layers were fabricated by means of sputtering. All of the layers except for the metallic layer 16 were formed successively and continuously without breaking the vacuum. By designing such medium constitution, a reflectivity of 18.5% was achieved. The refractive index of ZnS was 2.3.

The results of comparative evaluations between Example 2 and Comparative Example 1 are as follows.

Figure 12:
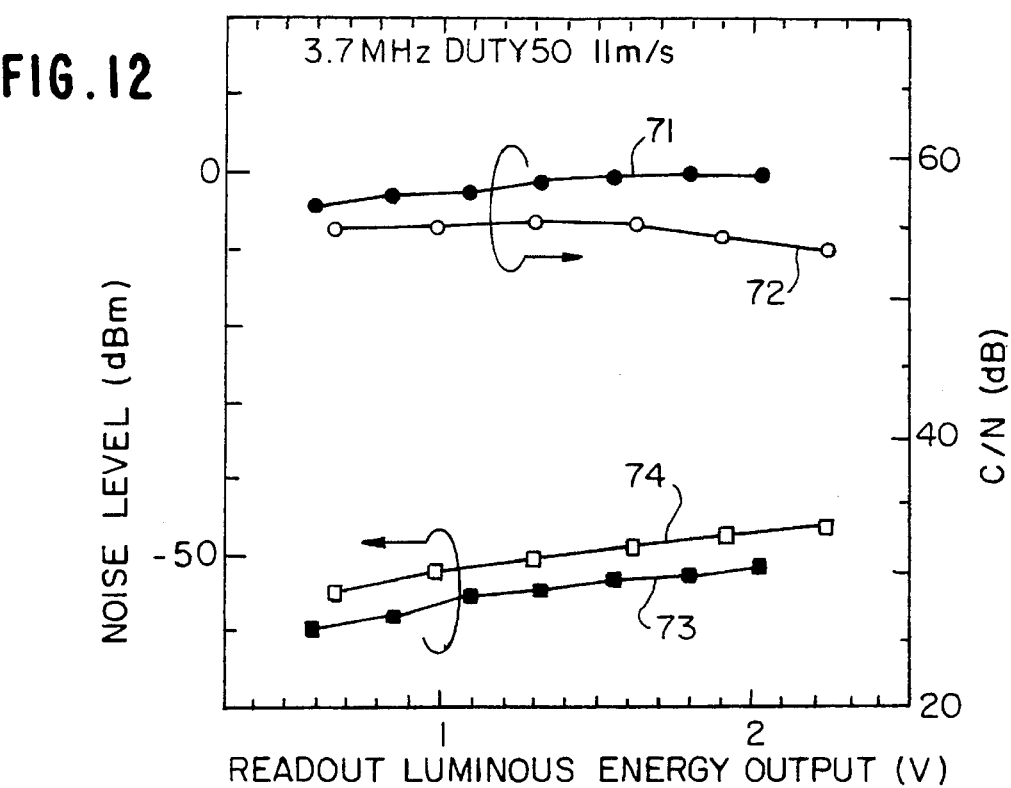
FIG. 12 shows changes in the C/N ratio and in the noise level relative to the optical output level.

FIG. 12 shows changes in the carrier-to-noise (C/N) ratio and in the record noise level relative to the optical output level, in which 71 is the C/N ratio of the medium of the invention, 72 the C/N ratio of the comparative example medium, 73 the noise level of the medium of the invention, and 74 the noise level of the comparative example medium.

The noise level of the medium of the invention and that of the comparative example medium increased at the same degree of inclination as the optical output level increased. However, the medium of the invention realized a lower noise level than in the comparative example medium. Meanwhile, the C/N ratio of the medium of the invention exceeded that of the comparative example medium, irrespective of the optical output level. Further, while the C/N ratio of the comparative example medium declined as the optical output level increased, that of the medium of the invention increased at a very small degree of inclination. Accordingly, the medium of the invention also enjoys the merits of low noise level and high carrier level at high readout laser power.

These evaluations were carried out under the following conditions: laser wavelength 680 nm, linear velocity 11.0 m/s, recording frequency 3.7 MHz, duty ratio 50% and magnetic field ±400 Oe.

Figure 13:
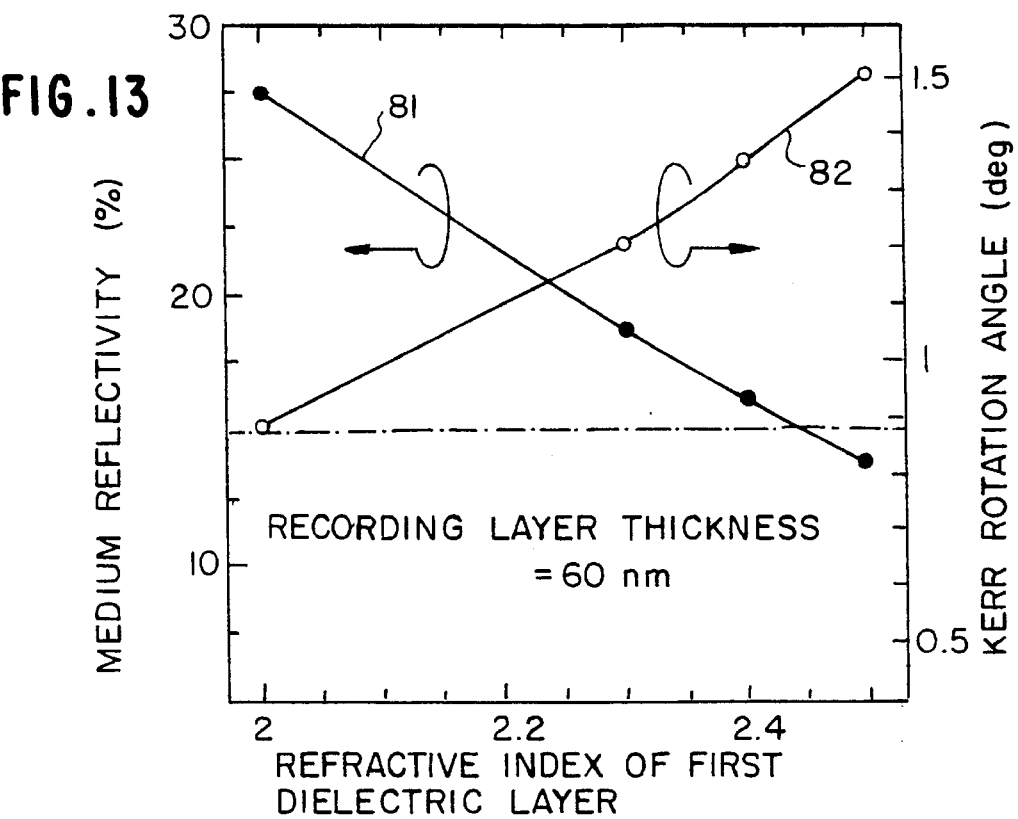
FIG. 13 shows a relationship between the refractive index of the first dielectric film, the reflectivity of the medium and the Kerr rotation angle.

The effect of using a dielectric film having a refractive index of 2.00 or more and less than 2.45 at least as the first dielectric layer will now be described. FIG. 13 shows changes in the reflectivity of the medium and in $\theta_k$ relative to the refractive index of the first dielectric film, in which 81 is the change in the reflectivity of the medium, and 82 the change in the Kerr rotation angle. A SiN layer having a refractive index of 2.0 was employed as the first dielectric layer. On the other hand, to change the refractive index of the second dielectric layer, ZnS layer or SiNx layer, the nitrogen content of which was changed by varying the partial pressure of $N_2$ at film formation, was employed as the second dielectric layer. In each medium, the film thickness of each dielectric layer was settled such that $\theta_k.R$ may assume the maximum level. The Kerr rotation angle increased as the refractive index of the first dielectric layer increased, showing that a dielectric layer having a high refractive index has an effect of increasing the Kerr rotation angle. However, if the refractive index of first dielectric layer is 2.45 or more, the reflectivity of the medium drops to 15% or less, even if its thickness is made great (60 nm) as in the present invention. Accordingly, the refractive index of the dielectric layer should critically be less than 2.45.

As demonstrated in Examples 1 and 2, the present invention is effective if any material is used as the dielectric layer, and TaN, SiO, $Ta_2O_5$, AlSiN or AlN can typically be used. While Al and Ti were employed as the reflective layers in Examples, films of other metals such as Cu, Cr, Ta or alloys thereof may be used.

Example 3

An embodiment in which AlN is used as the dielectric layer will be described. When 50 nm-thick Tb—Fe—Co recording layer and 40 nm-thick AlTi reflective layer were employed, the thickness of the first dielectric layer and that of the second dielectric layer were settled to be 77 nm and 161 nm, respectively. According to such medium constitution, a medium with a high carrier level and a low noise level was obtained.

Example 4

An embodiment in which $Ta_2O_5$ is used as the dielectric layer will be described. A double-layer was used as the recording layer, while a 20 nm-thick $Gd_{0.22}(Fe_{0.85}CO_{0.15})_{0.18}$ layer, a 40 nm-thick $Tb_{0.2}Fe_{0.8}$ layer and a 40 nm-thick AlTi layer were used as the reading layer, writing layer and reflective layer, respectively. By using a first dielectric layer having a film thickness of 75 nm and a second dielectric layer having a film thickness of 144 nm, a medium with a high carrier level and a low noise level was obtained.

As has been described theretofore, the noise level of the recording medium can be minimized. Further, because of the reflective layer structure in which the film thickness of the second dielectric layer is greater than that of the first dielectric layer, the possible drop in the reflectivity can be prevented particularly when a short wavelength of, for example, 680 nm is employed as the light source, and a high readout signal level can be realized. Thus, a medium which can exhibit a high C/N ratio as a whole can be obtained.

Although four embodiments of the present invention have been described therein, it should be apparent to those skilled in the art that the present invention may be embodied in many other specific forms without departing from the spirit or scope of the invention. Therefore, the present embodiments are to be considered as illustrative and not restrictive, and the invention is not to be limited to the details given therein, but may be modified within the scope of the appended claims.

What is claimed is:

1. A magneto-optical recording medium having a film of amorphous rare earth-transition metal alloy as a recording layer, comprising:

a substrate;

a first dielectric layer;

a recording layer;

a second dielectric layer; and a reflective layer, laminated in this order, wherein a total film thickness of said recording layer is 40 nm or more and less than 80 nm, wherein a thickness of said second dielectric layer is greater than a thickness of said first dielectric layer, and wherein the thickness of said second dielectric layer and the thickness of said first dielectric layer maximize a product of a Kerr rotation angle and a reflectivity of said medium.

2. The magneto-optical recording medium according to claim 1, wherein said recording layer is a double-layer film comprising a reading layer and a writing layer, wherein said reading layer and said writing layer both have a film thickness of 20 nm or more, wherein said reading layer has a Curie temperature higher than a Curie temperature of said writing layer, wherein said reading layer has a coercivity lower than a coercivity of said writing layer, and wherein said reading and writing layer are exchange-coupled so as to allow the magnetization to be transcribed from said reading layer to said writing layer.

3. The magneto-optical recording medium according to claim 1, wherein a material having a refractive index of 2.00 or more and less than 2.45 is used as said first dielectric layer.

4. The magneto-optical recording medium according to claim 1, wherein said medium is compatible with a light source that emits a laser beam having a wavelength not greater than a short wavelength region of visible light.

5. The magneto-optical recording medium according to claim 1, wherein said thickness of said first dielectric layer and said second dielectric layer are determined by setting said thickness of said first dielectric layer to a first value while varying said thickness of said second dielectric layer and selecting said thickness of said second dielectric layer to be a thickness at which said product of said Kerr rotation angle and said reflectivity is maximized.

6. The magneto-optical recording medium according to claim 2, wherein a wall energy density of said reading layer is smaller than a wall energy density of said writing layer except around said Curie temperature of said writing layer.

7. The magneto-optical recording medium according to claim 4, wherein said wavelength approximately equals 680 nm.

8. A magneto-optical recording medium having a film of amorphous rare earth-transition metal alloy as a recording layer, comprising:

a substrate;

a first dielectric layer;

a recording layer which comprises a double-layer film consisting of a reading layer and a writing layer, wherein said reading layer has a Curie temperature higher than a Curie temperature of said writing layer and wherein said reading layer has a coercivity lower than a coercivity of said writing layer;

a second dielectric layer; and a reflective layer, laminated in this order, wherein a total film thickness of said recording layer is 40 nm or more and less than 80 nm, wherein a thickness of said second dielectric layer is greater than a thickness of said first dielectric layer, and wherein the thickness of said second dielectric layer and the thickness of said first dielectric layer maximize a product of a Kerr rotation angle and a reflectivity of said medium.

9. The magneto-optical recording medium according to claim 8, wherein said reading layer and said writing layer both have a film thickness of 20 nm or more and are exchange-coupled so as to allow the magnetization to be transcribed from said reading layer to said writing layer.

10. The magneto-optical recording medium according to claim 8, wherein a material having a refractive index of 2.00 or more and less than 2.45 is used as said first dielectric layer.

11. The magneto-optical recording medium according to claim 8, wherein a wall energy density of said reading layer is smaller than a wall energy density of said writing layer except around said Curie temperature of said writing layer.

12. The magneto-optical recording medium according to claim 8, wherein said medium is compatible with a light source that emits a laser beam having a wavelength not greater than a short wavelength region of visible light.

13. The magneto-optical recording medium according to claim 8, wherein said thickness of said first dielectric layer and said second dielectric layer are determined by settling said thickness of said first dielectric layer to a first value while varying said thickness of said second dielectric layer and selecting said thickness of said second dielectric layer to be a thickness at which said product of said Kerr rotation angle and said reflectivity is maximized.

14. The magneto-optical recording medium according to claim 12, wherein said wavelength approximately equals 680 nm.

* * * * *